United States Patent [19]

Verhelst et al.

[11] Patent Number: 5,344,584
[45] Date of Patent: Sep. 6, 1994

[54] CYANATE-REACTIVE COMPOSITIONS

[75] Inventors: Gabriel Verhelst, Herent; Philip Cornet, Overijse; Benoit F. de Veubeke, Hamme-Mille; Bleys: Geert, Heverlee, all of Belgium

[73] Assignee: Imperial Chemical Industries Plc., London, England

[21] Appl. No.: 809,810

[22] Filed: Dec. 18, 1991

[30] Foreign Application Priority Data

Dec. 27, 1990 [GB] United Kingdom ............... 9028096

[51] Int. Cl.$^5$ .............. B01J 13/00; C09K 3/00
[52] U.S. Cl. ............ 252/182.27; 252/182.13; 252/182.24; 252/182.25; 252/309; 252/312; 252/354; 252/355; 252/356; 252/357
[58] Field of Search ............ 252/182.13, 182.24, 252/182.25, 182.27, 309, 312

[56] References Cited

U.S. PATENT DOCUMENTS

| | | | |
|---|---|---|---|
| 3,489,698 | 1/1970 | Morehouse | 521/174 X |
| 3,726,835 | 4/1973 | Bertozzi et al. | 260/75 |
| 3,857,800 | 12/1974 | Fishbein et al. | 521/174 |
| 4,093,759 | 6/1978 | Otsuki et al. | 428/35 |
| 4,127,516 | 11/1978 | Larsen et al. | 521/137 |
| 4,273,884 | 6/1981 | Dominguez | 521/114 |
| 4,374,935 | 2/1983 | Dicker et al. | 521/173 |
| 4,485,032 | 11/1984 | Olstowski et al. | 252/182.26 |
| 4,576,731 | 3/1986 | Reick | 252/182.27 X |
| 4,673,696 | 6/1987 | Tsai | 521/172 |
| 4,767,795 | 8/1988 | Adam et al. | 521/99 |
| 4,910,231 | 3/1990 | Pham et al. | 521/159 |
| 5,063,253 | 11/1991 | Gansen et al. | 521/159 |

FOREIGN PATENT DOCUMENTS

| | | |
|---|---|---|
| 0039162 | 11/1981 | European Pat. Off. . |
| 0309218 | 3/1984 | European Pat. Off. . |
| 0164817 | 12/1985 | European Pat. Off. . |
| 0276927 | 8/1988 | European Pat. Off. . |
| 0311474 | 4/1989 | European Pat. Off. . |
| 2200752 | 7/1972 | Fed. Rep. of Germany . |
| 2364157 | 7/1974 | Fed. Rep. of Germany . |
| 3824055 | 1/1990 | Fed. Rep. of Germany . |
| 2163762 | 3/1986 | United Kingdom . |

*Primary Examiner*—Richard D. Lovering

[57] ABSTRACT

An isocyanate-reactive composition comprising a first isocyanate-reactive compound and a second isocyanate-reactive compound which is normally immiscible with the first isocyanate-reactive compound and a stabilizing amount of a surfactant compound comprising a carboxylic acid ester or amide carrying a terminal acid group selected from carboxymethyl, sulphate, sulphonate, phosphate and phosphonate, provided that the methyl radical of the carboxymethyl group is not directly attached to a carbon atom of an unsubstituted hydrocarbon chain containing two or more carbon atoms.

9 Claims, No Drawings

CYANATE-REACTIVE COMPOSITIONS

This invention relates to compositions of matter and more particularly to isocyanate-reactive compositions, to their preparation and to their use in the production of polyurethane and polyurea materials.

The manufacture of useful polymeric materials by reacting organic polyisocyanates with compounds containing a plurality of isocyanate-reactive groups is well established. Thus, polyurethane materials, which may take the form of adhesives, coatings, elastomers, fibres, films, foams, thermoplastics and the like are produced on a large scale by reacting polyisocyanates with polyols. Similarly, polyurea materials may be obtained by reacting polyisocyanates with polyamines or polyimines.

The properties of the final polymeric product may be varied in known manner by appropriate choice of the isocyanate-reactive material. Further variation may be obtained by using mixtures of two or more isocyanate-reactive compounds differing in respect of molecular weight, functionality, nature of isocyanate-reactive groups and/or environment of the isocyanate-reactive groups. Thus, many of the formulations used in practice contain an isocyanate-reactive polymer having a functionality of from 2 to 4 and an equivalent weight of from 750 to 3000 and also one or more other active hydrogen compounds which may have equivalent weights in a similar range but which frequently are simple glycols or diamines.

In addition to the polyisocyanate and isocyanate-reactive materials, a practical formulation can contain several other ingredients such as blowing agents, catalysts, surfactants, foam stabilisers, cell openers, fire retardants, fillers, dyes, pigments and internal mould release agents, some of which additives can themselves be isocyanate-reactive. In order to minimise the number of components requiring to be brought together in the final mixing step, it is conventional to pre-blend these individual ingredients to form, if possible, a two-stream system whereby one stream comprises the polyisocyanate and the second stream comprises the isocyanate-reactive materials. Inert additives are commonly included in the isocyanate-reactive stream but can often be incorporated with the polyisocyanate.

It is important that the pre-blends mentioned above should remain substantially stable and uniform in composition from the time of their preparation to the time of their use in the production of polyurethanes, polyureas and the like. In particular, there should be no separation of one or more components from the other components requiring agitation to effect re-homogenisation. This desirable state of affairs is often difficult to achieve in the case of isocyanate-reactive compositions containing an isocyanate-reactive polymer together with other isocyanate-reactive species which may or may not be polymeric. This difficulty arises from the well known incompatibility of polymers with other polymers and with other materials. Thus, for example, a polyoxypropylene polyol of the type used in many polyurethane formulations is generally incompatible with a polyether polyol having a high oxyethylene content or with a polyester polyol or with a low molecular weight glycol or diamine.

It has now been found that mixtures of the isocyanate-reactive polymers used in polyurethane and polyurea formulations and normally incompatible isocyanate-reactive materials may be miscibilised by the inclusion of a specific type of surfactant, the resulting compositions being stable for extended periods.

Accordingly, the invention provides an isocyanate-reactive composition comprising:

(1) a first isocyanate-reactive compound having a functionality of from 2 to 4 and an average equivalent weight of from 500 to 5000;

(2) a second isocyanate-reactive compound which is normally immiscible with the first isocyanate-reactive compound and has a functionality of at least 2 and an average equivalent weight of from 30 to 5000;

characterised in that it further comprises (3) a stabilising amount of a surfactant compound comprising a carboxylic acid ester or amide carrying a terminal acid group selected from carboxymethyl, sulphate, sulphonate, phosphate and phosphonate, provided that the methyl radical of the carboxymethyl group is not directly attached to a carbon atom of an unsubstituted hydrocarbon chain containing two or more carbon atoms.

The expression "functionality" used herein in relation to the isocyanate-reactive compounds refers to the average number of isocyanate-reactive groups per molecule.

The expression "equivalent weight" used herein in relation to the isocyanate-reactive compounds refers to the molecular weight divided by the functionality.

The expression "normally immiscible" used herein in relation to the isocyanate-reactive compounds means that in the proportions being used, and in the absence of the surfactant, a mixture of the first and second isocyanate-reactive compounds separates into two distinct phases. It is possible, of course, that the two isocyanate-reactive compounds may be miscible in certain other proportions.

The first isocyanate-reactive compounds present in the composition of the invention may be, for example, a polymeric polyol, polyamine, imino-functional compound or enamine-containing compound.

Suitable polymeric polyols and methods for their preparation have been fully described in the prior art and, as examples of such polyols, there may be mentioned polyesters, polyesteramides, polythioethers, polycarbonates, polyacetals, polyolefins, polysiloxanes and, especially, polyethers.

Polyether polyols which may be used include products obtained by the polymerisation of a cyclic oxide, for example ethylene oxide, propylene oxide, butylene oxide or tetrahydrofuran in the presence, where necessary, of polyfunctional initiators. Suitable initiator compounds contain a plurality of active hydrogen atoms and include water and polyols, for example ethylene glycol, propylene glycol, diethylene glycol, cyclohexane dimethanol, resorcinol, bisphenol A, glycerol, trimethylolpropane, 1,2,6-hexanetriol or pentaerythritol. Mixtures of initiators and/or cyclic oxides may be used.

Especially useful polyether polyols include polyoxypropylene diols and triols and poly(oxyethylene-oxypropylene) diols and triols obtained by the simultaneous or sequential addition of ethylene and propylene oxides to di- or trifunctional initiators as fully described in the prior art. Mixtures of the said diols and triols can be particularly useful. Other particularly useful polyether polyols include polytetramethylene glycols obtained by the polymerisation of tetrahydrofuran.

The first isocyanate-reactive compound preferably has an average molecular weight in the range from 2000 to 10000, more preferably 3000–7000.

The second isocyanate-reactive compound may be any isocyanate-reactive compound that is normally immiscible with the first isocyanate-reactive compound and has a functionality of at least 2 and an average equivalent weight of from 30 to 5000. Thus, it may be an isocyanate-reactive polymer having a functionality of from 2 to 4 and an average equivalent weight of from 750 to 3000 chosen from any of the above mentioned classes from which the first isocyanate-reactive compound may be chosen although, of course, its constitution will be sufficiently different to make it immiscible with said first isocyanate-reactive compound. For example, the first isocyanate-reactive compound can be a polyoxypropylene polyol or a poly(oxypropylene-oxyethylene) polyol having an oxyethylene content of up to 20% by weight whilst the second isocyanate-reactive compound is poly(oxypropyleneoxyethylene) polyol having an oxyethylene content of 50% or more.

The surfactant compound present in the compositions of the invention is a compound comprising a carboxylic acid ester or amide carrying a terminal acid group selected from carboxymethyl, sulphate, sulphonate, phosphate and phosphonate (hereinafter referred to as the "acid-group") provided that the methyl radical of the carboxymethyl group is not directly attached to a carbon atom of an unsubstituted hydrocarbon chain containing two or more carbon atoms.

The carboxylic acid ester or amide is preferably an oligo-or poly-ester comprising from 2 to 100 units of one or more hydroxycarboxylic acid monomers.

A preferred compound in accordance with the present invention conforms to the general formula:

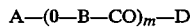

A—(0—B—CO)$_m$—D  I wherein A and D are groups one of which is or carries the acid group as hereinbefore defined and the other is a convenient terminal group which does not render the compound hydrophilic, B is a divalent hydrocarbon group and m is from 1 to 100.

In the compound of Formula I, when D carries the acid group, A is preferably the residue (A$^1$—CO—) of an esterifiable carboxylic acid of the formula A$^1$—COOH, in which A$^1$ is H, a hydrocarbon or a substituted hydrocarbon. Although A$^1$ is conveniently an optionally substituted alkyl, alkenyl, cycloalkyl or polycycloalkyl group containing up to 50, more preferably up to 35, carbon atoms, it can be any convenient monovalent group. In this case D is preferably a polyvalent, more preferably di- or tri-valent, bridging group linking the acid group to the ester chain, A$^1$-CO(O—B—CO)$_m$—, e.g. a group such as D$^2$ defined below. Where D has a valency greater than 2 it may link two or more acid groups to a single ester or two or more ester chains to a single acid group. Where the acid group has more than one valency it may be linked to two or more esters through two bridging groups.

In the compound of Formula I, when A carries the acid group, D is preferably the residue of an alcohol, a thiol or a primary or secondary amine, D$^1$—XH, in which D$^1$ is an aliphatic or alicyclic group of similar character to A$^1$ and X is O, S or NR in which R is H, alkyl, alkenyl, cycloalkyl, or phenyl, in which the alkyl and alkenyl groups contain up to 20 carbon atoms and the cycloalkyl groups from 4 to 8 carbon atoms. In this case A is preferably the acid group itself and where this has more than one valency it may be linked to two or more polyester chains, although A may also be a polyvalent linking group, like D above, linking the acid group to the polyester chain. The hydrocarbon group represented by B, which is preferably an optionally substituted alkyl, alkenyl, cycloalkyl or polycycloalkyl group, preferably contains up to 50, more preferably from 3 to 24, carbon atoms, with at least 3 carbon atoms directly between the —O— and —CO— groups. Optional substituents for A$^1$ D$^1$ and B include halo, especially chloro hydroxy, amino, alkoxy and other non-ionic species in so far as they do not make the ester/amide chain hydrophilic in character.

It is preferred that m is from 2 to 75, more preferably 3 to 30, so that the compound of Formula I is an oligo- or poly-ester. Where m=1 it is preferred that the group represented by A or D which is remote from the acid group contains at least 6 carbon atoms and that the surfactant contains at least 12 carbon atoms and more preferably at least 20 carbon atoms.

A first suitable compound for use as a surfactant in the compositions of the present invention is a compound which comprises a hydrophobic component and a hydrophilic component covalently bonded together, wherein the hydrophobic component is the residue of an oligomeric or polymeric monocarboxylic acid of the formula:

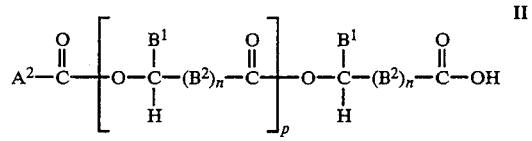

in which
A$^2$ is hydrogen or a monovalent hydrocarbon or substituted hydrocarbon group;
B$^1$ is hydrogen or a monovalent C$_1$ to C24 hydrocarbon group;
B$^2$ is a divalent C$_1$ to C24 hydrocarbon group;
n is zero or 1; and
p is zero or an integer up to 100, preferably 2 to 20, and wherein the hydrophilic component contains an anionic grouping selected from phosphate, phosphonate, sulphate, sulphonate and carboxymethyl, i.e. the acid group.

The acid group may be in the free acid form or as a salt thereof with a base, for example, ammonia, organic bases such as amines and aminoalcohols, and inorganic bases.

A second suitable compound for use as a surfactant in the composition of the present invention is a compound conforming to the formula:

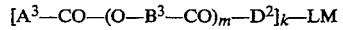

[A$^3$—CO—(O—B$^3$—CO)$_m$—D$^2$]$_k$—LM  III wherein
A$^3$—CO is the residue of an esterifiable carboxylic acid of the formula, A$^3$—COOH;
B$^3$ is selected from alkylene, alkenylene, cycloalkylene, polycycloalkylene and halo derivatives thereof;
D$^2$ is a bridging group of the formula—X—G—Y— wherein X is O, S, or NR and Y is O, NR or a direct link, in which each R independently is as hereinbefore defined or, where X and Y are both NR, the two groups, R, may form a single alkylene or alkenylene group linking the two nitrogens to which they are attached, and G is alkylene, alkenylene, cycloalkylene or arylene;

L is phosphonate, sulphonate or methylenecarboxylate;

M is a cation;

k is 1 or 2;

and m is as hereinbefore defined.

A third compound suitable for use as a surfactant in the composition of the present invention is a compound conforming to the formula:

$$[D^1—X—(CO—B^3—O)_m]_k—L \quad M \qquad \text{IV}$$

wherein $D^1$ is an aliphatic or alicyclic group and $B^3$, L, M, X, m and k are as hereinbefore defined.

The residue of the esterifiable carboxylic acid represented by A3CO in Formula III may be any convenient terminal hydrophobic group for the ester chain, —(O—$B^3$—CO)$_m$, although it is preferably an optionally substituted alkyl, alkenyl, cycloalkyl or polycycloalkyl group containing up to 50 carbon atoms and more preferably from 1 to 35 carbon atoms. The optional substituents are preferably selected from hydroxy, amino, halogen and alkoxy provided $A^3$ retains its hydrophobic character.

The alkylene, alkenylene, cycloalkylene and polycycloalkylene groups represented by $B^3$ preferably contain from 3 to 35 carbon atoms, more preferably from 5 to 20 carbon atoms, with at least 3 and more preferably at least 5 carbon atoms between the —O— and —CO— groups, and are preferably unsubstituted.

The alkylene and alkenylene groups represented by G preferably contain up to 10 carbon atoms and more preferably from 2 to 6 carbon atoms. The cycloalkylene group represented by G preferably contains from 4 to 8 carbon atoms and especially preferably is 1,4-cyclohexylene. The arylene group represented by G is preferably monocyclic and especially 1,4-phenylene.

The alkyl and alkenyl groups represented by R may contain up to 25 carbon atoms and preferably contain up to 5 carbon atoms. Where two groups, R, form a single group this preferably contains up to 10 carbon atoms.

In the compound of Formula III in which Y is O the acid group, L, is attached to the ester/amide chain through an oxygen atom so that phosphonate and O form phosphate and sulphonate and O from sulphate. Similarly, where Y is NR, phosphonate and NR form phosphorimide and sulphonate and NR form sulphonamide.

The cation represented by M is preferably $H^+$, a metal ion an ammonium ion or a substituted ammonium ion and examples of suitable cations are $Na^+$, $K^+$, $Ca^{2+}$, $NH_4^+$, $N(CH_3)_4^+$ and $NH(CH_3)_3^+$.

Specific examples of the bridging group represented by $D^2$ are $NHC_2H_4$—, —$OC_2H_4$—, —$OC_2H_4O$—, —$OC_2H_4NH$—, —$NH(CH_2)_nNH$—, wherein n is from 2 to 5, piperazin-1,4-ylene and phen-1,4-ylene- diamino.

Examples of the groups represented by $A^1$, $A^2$ and $A^3$ are methyl, ethyl, $CH_3(CH_2)_4$—, $CH_3(CH_2)_{10}$—, $CH_3(CH_2)_{14}$—, $CH_3(CH_2)_{16}$—, $HO(CH_2)_5$—, $CH_3(CH_2)_7CH{=}CH(CH_2)_7$—, $CH_3(CH_2)_{28}$—, $CH_3(CH_2)_5CH(OH)(CH_2)_{10}$—, $CH_3(CH_2)_4CH{=}CHCH_2CH{=}CH(CH_2)_7$—$CH_3(CH_2)_5CH(OH)CH_2CH{=}CH(CH_2)_7$—, and $CH_3OCH_2$— and the residue of abietic acid i.e. the radical derived from abietic acid by removal of the carboxyl group.

Examples of the group represented by $D^1$ are methyl ethyl $CH_3(CH_2)_9$—, $CH_3(CH_2)_{11}$—, $CH_3(CH_2)_{15}$—, $CH_3(CH_2)_{17}$—, $CH_3(CH_2)_{29}$—, $CH_3(CH_2)_7CH{=}CH(CH_2)_7$—, $CH_3OCH_2$—, $CH_3(CH_2)_4CH{=}CHCH_2CH{=}CH(CH_2)_7$— and the residue of abietyl alcohol, i.e. the radical derived from abietyl alcohol by removal of the OH group.

Examples of the groups represented by B and $B^3$ are:

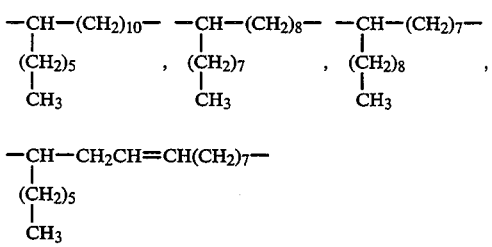

and —$(CH_2)_5$—.

Examples of the groups represented by $B^1$ are H, $C_6H_{13}$, $C_8H_{17}$ and $C_9H_{19}$ and by $B^2$ are —CH—$(CH_2)_{10}$—, —CH—$(CH_2)_8$, —CH—$(CH_2)_7$—, and —CH—$CH_2CH{=}CH(CH_2)_7$.

The surfactants of the compositions of the invention may be prepared by reaction between a polyester having a terminal carboxylic acid and/or hydroxy group and a compound having group reactive therewith and carrying a terminal acid group. Alternatively the polyester may be reacted directly with a precursor of the acid group or with a-bifunctional compound which is subsequently reacted with a precursor of the acid group. Preferred polyesters are those derived from hydroxy-carboxylic acids or lactones, such as 12-hydroxystearic acid and E-caprolactone. In the above processes, a monomeric precursor of the polyester may be used in place of the prepared polyester, whereby the polyester is formed in situ and directly converted into the surfactant. Suitable precursors of the polyester are hydroxycarboxylic acids and lactones. Suitable compounds containing the acid group are alpha-amino- or alpha-hydroxy-alkane carboxylic acids, such as glycine and glycollic acid and amino- and hydroxy-organic sulphonic or phosphonic acids, such as aminoethane sulphonic acid, suitable precursors of the acid group are phosphorus pentoxide and sulphonyl chloride and suitable bifunctional compounds, which can form a linking group between the polyester and the acid group, are polyamines, polyols and hydroxyamines.

The isocyanate-reactive compositions of the invention, suitably containing, on a weight basis, from 97.8 to 2 parts, preferably 94.5 to 30 parts of first isocyanate-reactive compound, from 2 to 97.8 parts, preferably from 5 to 69.5 parts, of second isocyanate-reactive compound, and from 0.2 to 25 parts, preferably from 0.5 to 10 parts of the above described surfactant in 100 parts of composition, may be prepared by simple mixing of the components. In some cases, however, stability of the isocyanate-reactive compositions is further improved by pre-blending the above described surfactant with one of the isocyanate-reactive compounds and then mixing this blend with the other isocyanate-reactive compound.

The compositions of the invention may be used at temperatures ranging between 10° C. and 100° C.

The compositions of the invention may be reacted with organic polyisocyanates using techniques and items of processing equipment that have been fully described in the prior art to form, depending upon the nature of the isocyanate-reactive groups, polyurethanes or polyureas which may take any of the known forms, for example adhesives, coatings, elastomers, fibres, films, foams or thermoplastics.

Organic polyisocyanates which may be reacted with the isocyanate-reactive compositions of the invention include the aliphatic, cycloaliphatic, araliphatic and aromatic polyisocyanates mentioned above in connection with the preparation of the polyurethane and polyurea particles, the preferred polyisocyanate for many purposes being MDI in one of its pure, crude or modified forms. Reaction between the organic polyisocyanate and the isocyanate-reactive composition of the invention may be performed in the presence of reactive or non-reactive additives already described for use in polyurethane or polyurea processes. In addition to the chain extenders, cross-linkers and the like already mentioned, such additives include blowing agents, catalysts, surfactants, foam stabilisers, cell openers, fire retardants, fillers, dyes, pigments and internal mould release agents.

Blowing agents which may be used include water and inert volatile liquids which vaporise under the influence of the exothermic reaction, such liquids typically having boiling points not exceeding 100° C., preferably not exceeding 50° C., at atmospheric pressure.

Catalysts which may be used include tertiary amines such as 1,4-diazabicyclo[2.2.2]octane, N,N-dimethylethanolamine, bis(2-dimethylaminoethyl)ether, N-ethylmorpholine and N,N'-diethylpiperazine and tin compounds such as stannous octoate and dibutyltin dilaurate.

Surfactants and foam stabilisers which may be used include oxyethylated alkylphenols, ethylene oxide-propylene oxide block copolymers and siloxane-oxyalkylene copolymers.

Fire retardants may be of the isocyanate-reactive or non-reactive types and fillers may be organic, particulate or fibrous.

If desired, one or more of the above mentioned additives may be incorporated in the compositions of the invention.

The invention is illustrated but not limited by the following Examples.

EXAMPLE

Polyol A: Arcol A 2580: a 4000 MW triol. EO content is 77% random. Hydroxyl value: 42%. Arcol is a trademark of Arco Chemicals Company.

Polyol B: Daltocel F 2805 polyol: A 6000 MW, EO/PO triol. EO content is 15% in tip. Daltocel is a trademark of ICI PLC.

Polyol C: Daltocel F 3507 polyol: A 4700 MW, EO/PO triol. EO content is 17% in tip.

Surfactant A: The product prepared in example 15 of EP164817.

A 4% by weight solution of surfactant A in polyol A was prepared. This solution was then blended with different polyols according to the data in table 1 (in which all parts are by weight).

The stabilities of the blends were assessed visually.

TABLE 1

| 4% bw. solution | Surfactant A/Polyol A | | Stability range |
|---|---|---|---|
| | Polyol B | Polyol C | |
| 70 | 30 | — | >1 month |
| 30 | — | 70 | >3 months |
| 70 | — | 30 | >3 months |
| 50 | — | 50 | >2 months |
| 5 | 95 | — | >1 week |
| 5 | — | 95 | >1 week |

We claim:
1. An isocyanate-reactive composition comprising:
   (1) a first isocyanate-reactive compound having a functionality of from 2 to 4 and an average equivalent weight of from 500 to 5000;
   (2) a second isocyanate-reactive compound which is normally immiscible with the first isocyanate-reactive compound and has a functionality of at least 2 and an average equivalent weight of from 30 to 5000;
characterized in that it is further comprises
   (3) a stabilizing amount of a surfactant compound comprising a carboxylic acid ester or amide carrying a terminal acid group selected from the group consisting of carboxymethyl, sulphate, sulphonate, phosphate, and phosphonate, provided that the methyl radical of the carboxymethyl group is not directly attached to a carbon atom of an unsubstituted hydrocarbon chain containing two or more carbon atoms.

2. A composition according to claim 1, characterised in that it is an emulsion.

3. A composition according to claim 1 wherein the surfactant compound is $$A\text{—}(O\text{—}B\text{—}CO)_m\text{—}D$$

wherein one of the groups represented by A and D is, or carries, the acid group and the other is any convenient terminal group which does not render the compound hydrophilic, B is a divalent hydrocarbon group and m is from 1 to 100.

4. A composition according to claim 1 wherein the surfactant compound comprises a hydrophobic component and a hydrophilic component covalently bonded together, wherein the hydrophobic component is the residue of an oligomeric or polymeric monocarboxylic acid of the formula

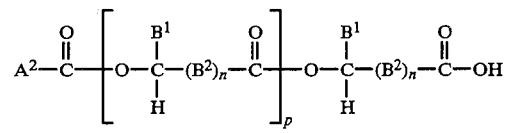

in which
A$^2$ is a hydrogen or a monovalent hydrocarbon or substituted hydrocarbon group;
B$^1$ is hydrogen or a monovalent, C$_1$ to C$_{24}$ hydrocarbon group;
B$^2$ is a divalent C$_1$ to C$_{24}$ hydrocarbon group;
n is zero or 1; and
p is zero or an integer up to 100,
and wherein the hydrophilic component contains an acid group selected from the group consisting of phosphate, phosphonate, sulphate, sulphonate and carboxymethyl.

5. A composition according to claim 1 wherein the surfactant is a compound conforming to the formula $$[A^3—CO—(O—B^3—CO)_m—D^2]_k—L\ M$$

wherein

A$^3$—CO is the residue of an esterifiable carboxylic acid of the formula, A$^3$—COOH;

B$^3$ is selected from the group consisting of alkylene, alkenylene, cycloalkylene, polycycloalkylene and halo derivatives thereof;

D$^2$ is a bridging group of the formula—X—G—Y— wherein X is O, S or NR and Y is O, NR or a direct link, in which each R independently is as hereinbefore defined or, where X and Y are both NR, the two groups, R, may form a single alkylene or alkenylene group linking the two nitrogens to which they are attached, and G is alkylene, alkenylene, cycloalkylene or arylene;

L is phosphonate, sulphonate or methylenecarboxylate;

M is a cation;

k is 1 or 2;

and m is as hereinbefore defined.

6. A composition according to claim 1 wherein the surfactant is a compound conforming to the formula $$[D^1—X—(CO—B^3O)_m]_k—LM$$

wherein D$^1$ is an aliphatic or alicyclic group and B$^3$, L, M, X, m and k are as hereinbefore defined.

7. A composition according to claim 1 wherein each of the isocyanate-reactive compounds, independently, is selected from the group consisting of polyols, polyamines, imino-functional compounds and enamine-containing compounds.

8. A composition according to claim 1 wherein the first isocyanate-reactive compound is a polyoxypropylene polyol or a poly(oxypropylene-oxyethylene) polyol having an oxyethylene content of up to 20% by weight and the second isocyanate-reactive compound is a poly(oxypropylene-oxyethylene) polyol having an oxyethylene content of at least 50% by weight.

9. A composition according to claim 1 containing, on a % weight basis:
a) from 97.8 to 2 parts of first isocyanate-reactive compound,
b) from 2 to 97.8 parts of second isocyanate-reactive compound,
c) from 0.2 to 25 parts of surfactant compound.

* * * * *